Figure 1:
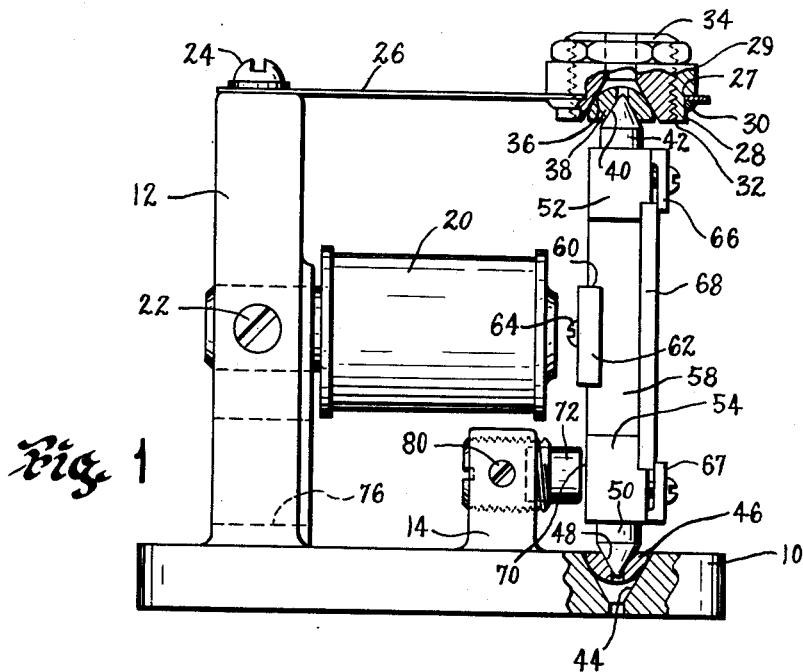

March 31, 1953  F. W. HERR  2,633,544
OSCILLATING ELECTRIC MOTOR
Filed Sept. 3, 1949

INVENTOR
FREDERICK W. HERR
BY
Louis L. Gagnon
Noble S. Williams
ATTORNEYS

Patented Mar. 31, 1953

2,633,544

UNITED STATES PATENT OFFICE 2,633,544

OSCILLATING ELECTRIC MOTOR

Frederick W. Herr, South Bend, Ind., assignor to American Optical Company, Southbridge, Mass., a voluntary association of Massachusetts Application September 3, 1949, Serial No. 114,008

4 Claims. (Cl. 310—36)

This invention relates to electric motors and more particularly to electric motors of the type having pivotally mounted oscillating armatures.

In certain mechanisms, it has been found desirable to employ electric motors of the type described and to have the oscillating armatures thereof arranged during the swinging or oscillating movements thereof to synchronously follow the frequency or impulses of an electric current as well as to follow as closely as possible the predetermined and sometimes variable wave shapes thereof. Thus, when the swinging motion is considered against time, wave shapes of desired curve characteristics may be produced thereby. Such a wave motion might even be modified by other mechanical means if desired for effecting modified wave shapes to certain parts of such a curve. For example, an electric motor having a pivotally mounted oscillating armature and arranged to provide a variable wave motion for a light beam reflecting mirror carried upon the armature for optical purposes has been disclosed in co-pending application Serial No. 774,393 filed September 16, 1947, in the name of R. C. Beitz. The motor armature of the motor in this disclosure is required to follow, during its operation, the frequency of the alternating current supplying energy to the motor while having its amplitude variable in magnitude or even varied differently when swinging to opposite sides of its central position. Also, resilient means are provided to work in conjunction with this swinging armature to additionally modify certain portion or portions of this swinging motion while the armature still maintains the desired synchronism and phase relationship.

A motor of the type described may be subjected to considerable use under high and varying speeds and under most exacting operating conditions and thus it is most desirable that the moving parts thereof should not only operate with as little frictional resistance or "drag" as possible, in order to give as sensitive and complete response as possible, but also should be as free as possible from wear so that this high degree of performance of the motor armature will continue substantially unchanged over a long period of time. Obviously any looseness of play at any time in such a motor would be most objectionable. Thus, in order to best satisfy the above and other conditions in such a motor, applicant has provided an arrangement and construction such that the parts may be readily assembled and easily adjusted so as to provide a minimum of frictional resistance during operation thereof and a minimum of wear in the parts, with the parts being so arranged that no looseness or play will be present or will subsequently occur therein even after the motor has had extended use.

Figure 2:
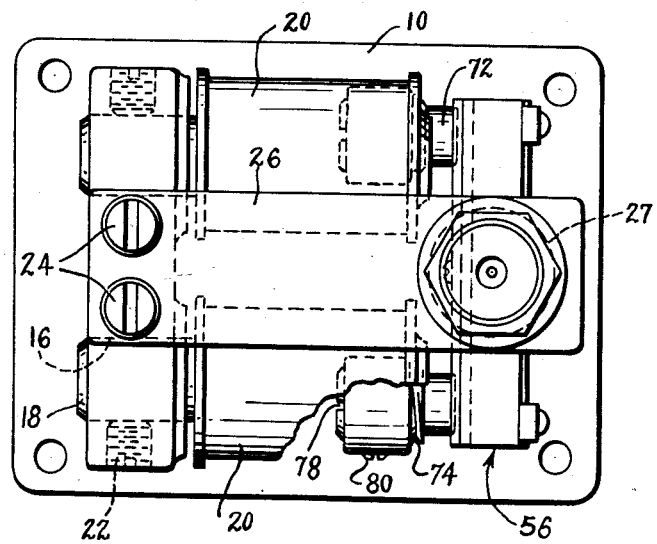

A better understanding of the invention will be had from the detailed description which follows when considered in conjunction with the accompanying drawing in which:

Fig. 1 is a side view of a motor comprising the present invention, with parts thereof being broken away to better show details of construction; and Fig. 2 is a plan view of the motor, also with parts broken away to better show details of construction.

An oscillating armature type motor embodying the present invention is shown in the drawing and comprises a main support or base 10 having a rigid upstanding supporting arm 12 near one end thereof and a pair of smaller rigid projections 14 thereon equally spaced at opposite sides of the central vertical plane extending longitudinally of the base. The purpose for the projections 14 will be described later. The supporting arm 12 is provided at opposite sides of this central plane with a pair of cylindrical openings 16 therethrough for receiving the cylindrically shaped ends 18 of a pair of electromagnets 20 and locking screws 22 extend into smaller openings in the opposite sides of the supporting arm 12 for engaging portions of the cylindrically shaped ends 18 and holding the magnets in desired positions of adjustment depending upon the use to which the motor is to be put.

At the upper end of the supporting arm 12 is securely clamped as by means of screws or the like 24 a flat flexible spring-like member 26 having a relatively large opening 27 in an outer free end portion thereof for the insertion of a tubular collar 28 which may have a ring-like flanged portion 29 thereof extending outwardly so as to rest upon the member 26 about said opening when the collar is positioned therein. When so positioned the collar may easily be soldered or otherwise fixedly secured to the spring-like member 26 as indicated at 30. The collar 28 has threads formed upon its inner surface as indicated at 32 for the reception of an adjustable threaded ring-like member 34 which has formed centrally in its lower portion a frustro-conically shaped bearing surface 36 against which bears an upper semi-spherically shaped oil or graphite impregnated porous bronze bearing 38. The bearing 38 is provided with a centrally located frustro-conically shaped and highly polished surface 40 in the lower part thereof so as to receive the upper conically shaped and highly polished end of a hardened steel pivot pin 42. The bearing 38 will thus be positioned substantially vertically above a frustro-conically shaped opening or recess 44 formed in the base 10 and is similarly adapted to receive a semi-spherically shaped graphite or oil impregnated porous bronze bearing 46 which likewise has formed centrally therein a frustro-conically shaped and highly polished bearing surface 48 facing upwardly so as to receive the highly polished conically shaped lower end of a hardened steel pivot pin 50. By making surfaces 40 and 48 frustro-conical instead of merely conical there is less chance of any lateral movement of the pivot pins should any wear at this location subsequently occur.

The pivot pins 42 and 50 are carried by and extend vertically from the horizontally disposed legs 52 and 54 of an H-shaped frame 56 and are aligned with the cross-bar 58 thereof so as to centrally support the frame for oscillatory movement. The frame 56 supports in a recess 60 at its inner side a transversely extending soft iron bar 62 which serves as the oscillating armature for the motor. The bar 62 is preferably secured in place by means of a centrally disposed screw 64. Upon the recessed front surface of the pivoted frame 56 is secured, by releasable clamping means 66, 67 or the like, a first surface mirror 68.

The lower leg 54 of the H-shaped frame, it will be noted, extends laterally so as to provide abutment surfaces 70 for engagement by a pair of laterally spaced resilient bumpers 72 of sponge rubber or the like carried by threaded cylindrical thimbles 74 which have screw-threaded engagement with threads in openings in the laterally spaced projections 14. These thimbles 74 may thus be adjusted by small amounts toward or away from the abutment surfaces 70 by the use of a screw driver or the like inserted through openings 76, provided for this purpose in the support 12, and into engagement with slots 78. Thus it is possible to accurately space the bumpers from said surfaces 70. Thimbles 74 may then be locked in operative positions by means of small screws 80 threaded into the sides of the projection 14.

Since the threaded ring-like element 34 may be moved by small increments toward or away from the base 10 a very exact amount of frictional engagement may be provided between the upper and lower semi-spherical bearing members 38 and 46 and the pivot pins 42 and 50. In fact, the use of the spring-like member 26 for supporting the upper semi-spherical bearing enables these parts to be maintained in very slight touching engagement at all times so that no play will exist or later occur therebetween even though a slight amount of wear might subsequently occur at the conical surfaces 40 and 48. On the other hand, since the spring-like member 26 is relatively wide and extends in a direction at right angles to the axis about which the armature oscillated, the frame 56 and mirror are prevented from tilting even slightly either laterally or longitudinally. Thus the ring-like member 34 may be moved downwardly toward the armature just sufficiently to produce a good working engagement between the conically and semi-spherically shaped surfaces. Furthermore, the semi-spherically shaped bearing members 38 and 46 are self-aligning and thus assume and maintain proper alignment of the conical surfaces 40 and 48 with the upper and lower pivot pins 42 and 50 so no binding effect will occur even though the center of the ring-like member 34 may not be positioned exactly over the center of the recess 44. While two pivot pins 42 and 50 have been described above, it will be obvious that a single pivot pin extending entirely through the center of the H-frame and provided with conically shaped ends could be as readily used.

Having described the invention, I claim:

1. An electric motor of the character described comprising a base, a pair of alternately energizable electro-magnets carried by said base, an armature normally disposed in an inactive position adjacent both of said electromagnets so as to be within the magnetic fields of said electromagnets during the energizing thereof, a pivot pin supporting said armature in said inactive position for oscillatory movement about a relatively fixed longitudinal axis centrally thereof and relative to said base, said pivot pin having conically shaped bearing surfaces upon the opposite ends thereof, a pair of self-aligning elements each having a conically shaped recess in engagement with one of said conically shaped ends, each of said self-aligning elements having a spherically curved exterior surface portion, a relatively thin, wide, elongated resilient arm normally fixedly carried by a part fixed relative to said base and having an elongated yieldable free end portion in spaced relation to said base, substantially axially aligned supporting means providing conically shaped recesses carried by the elongated free end portion of said arm and by said base, respectively, and engaging the spherically curved surface portions on said self-aligning elements, one of said supporting means comprising two screw-threaded sections secured together so as to allow one section thereof to be axially adjusted substantially along said fixed axis and relative to the other of said sections and into proper pressing engagement with the spherically curved surface on the adjacent one of said self-aligning elements, whereby said self-aligning elements are readily tiltable so as to allow uniform circumferential engagement between the conical surfaces on said pin and in said elements during relative oscillatory movement therebetween.

2. An electric motor of the character described comprising a base, a pair of alternately energizable electromagnets carried by said base, an armature normally disposed in an inactive position adjacent both of said electromagnets so as to be within the magnetic fields of said electromagnets during the energizing thereof, a pivot pin supporting said armature in said inactive position for oscillatory movement about a relatively fixed longitudinal axis centrally thereof and relative to said base, said pivot pin having conically shaped bearing surfaces upon the opposite ends thereof, a pair of self-aligning elements each having a conically shaped recess in engagement with one of said conically shaped ends, each of said self-aligning elements having a spherically curved exterior surface portion, a relatively thin, wide, elongated resilient arm normally fixedly carried by a part fixed relative to said base and having an elongated yieldable free end portion in spaced relation to said base, substantially axially aligned supporting means providing conically shaped recesses carried by the elongated free end portion of said arm and by said base, respectively, and engaging the spherically curved surface portions on said self-aligning elements, one of said supporting means comprising two screw-threaded sections secured together so as to allow one section thereof to be axially adjusted substantially along said fixed axis and relative to the other of said sections and into proper pressing engagement with the spherically curved surface on the adjacent one of said self-aligning elements, whereby said self-aligning elements are readily tiltable so as to allow uniform circumferential engagement between the conical surfaces on said pin and in said elements during relative oscillatory movement therebetween, and resilient means normally carried in relatively fixed relation to said base and arranged so as to engage a part movable with said armature and to provide yieldable opposition to the oscillating movement of said armature during a predetermined portion of the travel thereof in each direction about said fixed axis.

3. An electric motor of the character described comprising a base, a pair of alternately energizable electromagnets carried by said base, an armature normally disposed in an inactive position adjacent both of said electromagnets so as to be within the magnetic fields of said electromagnets during the energizing thereof, a pivot pin supporting said armature in said inactive position for oscillatory movement about a relatively fixed longitudinal axis centrally thereof and relative to said base, said pivot pin having conically shaped bearing surfaces upon the opposite ends thereof, a pair of self-aligning elements each having a conically shaped recess in engagement with one of said conically shaped ends, each of said self-aligning elements having a spherically curved exterior surface portion, a relatively thin, wide, elongated resilient arm normally fixedly carried by a part fixed relative to said base and having an elongated yieldable free end portion in spaced relation to said base, substantially axially aligned supporting means providing conically shaped recesses carried by the elongated free end portion of said arm and by said base, respectively, and engaging the spherically curved surface portions on said self-aligning elements, one of said supporting means comprising two screw-threaded sections secured together so as to allow one section thereof to be axially adjusted substantially along said fixed axis and relative to the other of said sections and into proper pressing engagement with the spherically curved surface on the adjacent one of said self-aligning elements, whereby said self-aligning elements are readily tiltable so as to allow uniform circumferential engagement between the conical surfaces on said pin and in said elements during relative oscillatory movement therebetween, resilient means normally carried in relatively fixed relation to said base and arranged so as to engage a part movable with said armature and to provide yieldable opposition to the oscillating movement of said armature during a predetermined portion of the travel thereof in each direction about said fixed axis, said resilient means each being adjustably secured relative to said base for movement in directions substantially perpendicular to the normal inactive position of said armature, and means for securing said resilient means in any position of adjustment thereof.

4. An electric motor of the character described comprising a base, a pair of alternately energizable electromagnets carried by said base, an armature normally disposed in an inactive position adjacent both of said electromagnets so as to be within the magnetic fields of said electromagnets during the energizing thereof, a pivot pin supporting said armature in said inactive position for oscillatory movement about a relatively fixed longitudinal axis centrally thereof and relative to said base, said pivot pin having conically shaped bearing surfaces upon the opposite ends thereof, a pair of self-aligning elements each having a conically shaped recess in engagement with one of said conically shaped ends, each of said self-aligning elements having a spherically curved exterior surface portion, a relatively thin, wide, elongated resilient arm normaly fixedly carried by a part fixed relative to said base and having an elongated yieldable free end portion in spaced relation to said base, substantially axially aligned supporting means providing conically shaped recesses carried by the elongated free end portion of said arm and by said base, respectively, and engaging the spherically curved surface portions on said self aligning elements, one of said supporting means comprising two screw-threaded sections secured together so as to allow one section thereof to be axially adjusted substantially along said fixed axis and relative to the other of said sections and into proper pressing engagement with the spherically curved surface on the adjacent one of said self-aligning elements, whereby said self-aligning elements are readily tiltable so as to allow uniform circumferential engagement between the conical surfaces on said pin and in said elements during relative oscillatory movement therebetween, resilient means normally carried in relatively fixed relation to said base and arranged so as to engage a part movable with said armature and to provide yieldable opposition to the oscillating movement of said armature during a predetermined portion of the travel thereof in each direction about said fixed axis, said resilient means each being adjustably secured relative to said base for movement in directions substantially perpendicular to the normal inactive position of said armature and means for securing said resilient means in any position of adjustment thereof, said electromagnets being adjustably secured relative to said base for movement in directions substantially perpendicular to the normal inactive position of said armature.

FREDERICK W. HERR.

REFERENCES CITED

The following references are of record in the file of this patent:

UNITED STATES PATENTS

| Number | Name | Date |
|---|---|---|
| 672,655 | Thalhofer | Apr. 23, 1901 |
| 927,859 | Joye | July 13, 1909 |
| 943,890 | Prisant | Dec. 21, 1909 |
| 1,458,658 | Leich | June 12, 1923 |
| 1,918,690 | Engelhardt | July 18, 1933 |
| 2,253,033 | Kochner | Aug. 19, 1941 |
| 2,289,227 | Walker | July 7, 1942 |
| 2,471,618 | Green | May 31, 1949 |